(12) United States Patent
Tsunehara et al.

(10) Patent No.: US 7,748,794 B2
(45) Date of Patent: Jul. 6, 2010

(54) BRAKING FORCE CONTROL METHOD FOR AUTOMOTIVE VEHICLE AND BRAKING FORCE CONTROL APPARATUS THEREFOR

(75) Inventors: Hiroshi Tsunehara, Kanagawa (JP); Hidetoshi Suzuki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1231 days.

(21) Appl. No.: 11/312,833

(22) Filed: Dec. 21, 2005

(65) Prior Publication Data

US 2007/0016352 A1    Jan. 18, 2007

(30) Foreign Application Priority Data

Dec. 22, 2004  (JP) ............................ 2004-370827
May 31, 2005   (JP) ............................ 2005-160474

(51) Int. Cl.
  *B60T 8/60*  (2006.01)
(52) U.S. Cl. ..................................... 303/155
(58) Field of Classification Search .................. 303/155
  See application file for complete search history.

(56) References Cited

U.S. PATENT DOCUMENTS 6,192,308 B1    2/2001  Onuma 6,669,310 B2 *  12/2003  Obuchi ...................... 303/155
2004/0222695 A1  11/2004  Miyazaki
2007/0132312 A1 *  6/2007  Ajiro et al. .................. 303/155

FOREIGN PATENT DOCUMENTS

| EP | 0 800 975 A2 | 10/1997 |
| GB | 2 336 413 A | 10/1999 |
| JP | 11-301434 A | 11/1999 |
| JP | 2004-291778 A | 10/2004 |
| JP | 2005-041319 A | 2/2005 |
| JP | 2005-067307 A | 3/2005 |

* cited by examiner

*Primary Examiner*—Bradley T King
(74) *Attorney, Agent, or Firm*—Foley & Lardner LLP

(57) ABSTRACT

In braking force control method for an automotive vehicle and braking force control apparatus therefor, contribution degrees of both of a stroke quantity of a brake input device and a master cylinder pressure developed in a master cylinder are set in accordance with at least one of the stroke quantity of the brake input device and the master cylinder pressure and the contribution degree of the master cylinder pressure on a calculation of a target braking force is set to become larger when an abrupt brake operation by a vehicle driver is detected (a control flag F is set to "1") than the contribution degree of the master cylinder pressure when no abrupt brake operation by the vehicle driver is detected (control flag F is reset to "0").

19 Claims, 11 Drawing Sheets

<ACCELERATOR ON OR BRAKE OFF
WITH ACCELERATOR OFF>

FIG.12 <BRAKE ON>

BRAKING FORCE CONTROL METHOD FOR AUTOMOTIVE VEHICLE AND BRAKING FORCE CONTROL APPARATUS THEREFOR

BACKGROUND OF THE INVENTION

The present invention relates to vehicular braking force control method and vehicular braking force control apparatus in which a braking force is controlled in accordance with a brake operation by a vehicle driver, in other words, a, so-called, brake-by-wire is performed.

A Japanese Patent Application First Publication No. Heisei 11-301434 published on Nov. 2, 1999 exemplifies a previously proposed vehicular braking force control apparatus. In the previously proposed braking force control apparatus disclosed in the above-described Japanese Patent Application First Publication, a target braking force is calculated on the basis of a master cylinder pressure and a stroke of a brake pedal and a vehicular braking force is controlled in accordance with the target braking force. Contribution degrees of the master cylinder pressure and the pedal stroke are modified in accordance with at least one of the master cylinder pressure and the pedal stroke. Especially, at an initial stage of a pedal depression, the contribution degree of the pedal stroke is made larger than the contribution degree of the master cylinder pressure. This is because there is a general tendency that the vehicle driver tries to mainly adjust the pedal stroke at a low deceleration region in which a desired deceleration is low and tries to mainly adjust a pedal depression force at a high deceleration region in which the desired deceleration is high.

SUMMARY OF THE INVENTION

In a case where the brake-by-wire is performed, a stroke simulator which elastically shrinks according to a liquid pressure developed in the master cylinder is provided in order to generate an appropriate pedal stroke and a pedal reaction force for a brake operation by the vehicle driver. A flow passage mainly communicated between the master cylinder and the stroke simulator provides an orifice for a brake liquid which is caused to flow from the master cylinder to the stroke simulator. Hence, as the vehicle driver more abruptly depresses the brake pedal desiring the large deceleration, a stream speed of the brake liquid caused to flow from the master cylinder to the stroke simulator is more limited at an initial stage of the abrupt pedal depression. Thus, the master cylinder pressure becomes larger than that when the vehicle driver gradually depresses the brake pedal. In addition, by the limitation of the stream speed of the brake liquid, the brake pedal does not stroke as the vehicle driver intends.

However, in the previously proposed braking force control apparatus disclosed in the above-described Japanese Patent Application First Publication, the target braking force is calculated with the contribution degree of the pedal stroke set to be large at the initial stage of the pedal stroke. Hence, even though the master cylinder pressure becomes large when the brake pedal is abruptly depressed by the vehicle driver, the contribution degree of the master cylinder pressure on an increase in the target deceleration is low. That is to say, even if the vehicle driver abruptly depresses the brake pedal desiring the large deceleration, the pedal stroke is not increased to a degree that the vehicle driver desires, at the initial stage of the pedal depression. It is difficult to say that an intention of the vehicle driver is accurately reflected on the target braking force.

With the above-described point in mind, it is an object of the present invention to provide braking force control method for an automotive vehicle and braking force control apparatus therefor which are capable of reflecting accurately the intention of the vehicle driver on the target braking force even at the initial stage of the brake operation.

To achieve the above-described object, according to one aspect of the present invention, there is provided with a braking force control method for an automotive vehicle, comprising: providing a brake input device manually operable by a vehicle driver; providing a master cylinder configured to develop a master cylinder pressure in accordance with an operation of the brake input device by the vehicle driver; setting contribution degrees of both of a stroke quantity of the brake input device and the master cylinder pressure in accordance with at least one of the stroke quantity of the brake input device and the master cylinder pressure developed in the master cylinder; calculating a target braking force of the vehicle on the basis of the contribution degrees of both of the stroke quantity and the master cylinder pressure; and controlling the braking force of the vehicle in accordance with the calculated target braking force, the contribution degree of the master cylinder pressure on a calculation of the target braking force being set to become larger when an abrupt brake operation by the vehicle driver is detected than the contribution degree of the master cylinder pressure when no abrupt brake operation by the vehicle driver is detected.

To achieve the above-described object, according to another aspect of the present invention, there is provided with a braking force control apparatus for an automotive vehicle, comprising: a brake input device manually operable by a vehicle driver; a master cylinder configured to develop a master cylinder pressure in accordance with an operation of the brake input device by the vehicle driver; a contribution degree setting section that sets contribution degrees of both of a stroke quantity of the brake input device and the master cylinder pressure in accordance with at least one of the stroke quantity of the brake input device and the master cylinder pressure developed in the master cylinder; a target braking force calculating section that calculates a target braking force of the vehicle on the basis of the contribution degrees of both of the stroke quantity of the brake input device and the master cylinder pressure; and a braking force control section that controls the braking force of the vehicle in accordance with the calculated target braking force, the contribution degree setting section setting the contribution degree of the master cylinder pressure on a calculation of the target braking force to become larger when an abrupt brake operation by the vehicle driver is detected than the contribution degree of the master cylinder pressure when no abrupt brake operation by the vehicle driver is detected. It is noted that the abrupt brake operation is defined as a brake operation such that an operation speed or an operation acceleration of a brake operation of the brake input device (namely, a brake pedal) by the vehicle driver provides a large value (for example, 0.3 G or larger) for a previously set value corresponding to the brake operation during an ordinary street run of the vehicle.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

Figure 1:
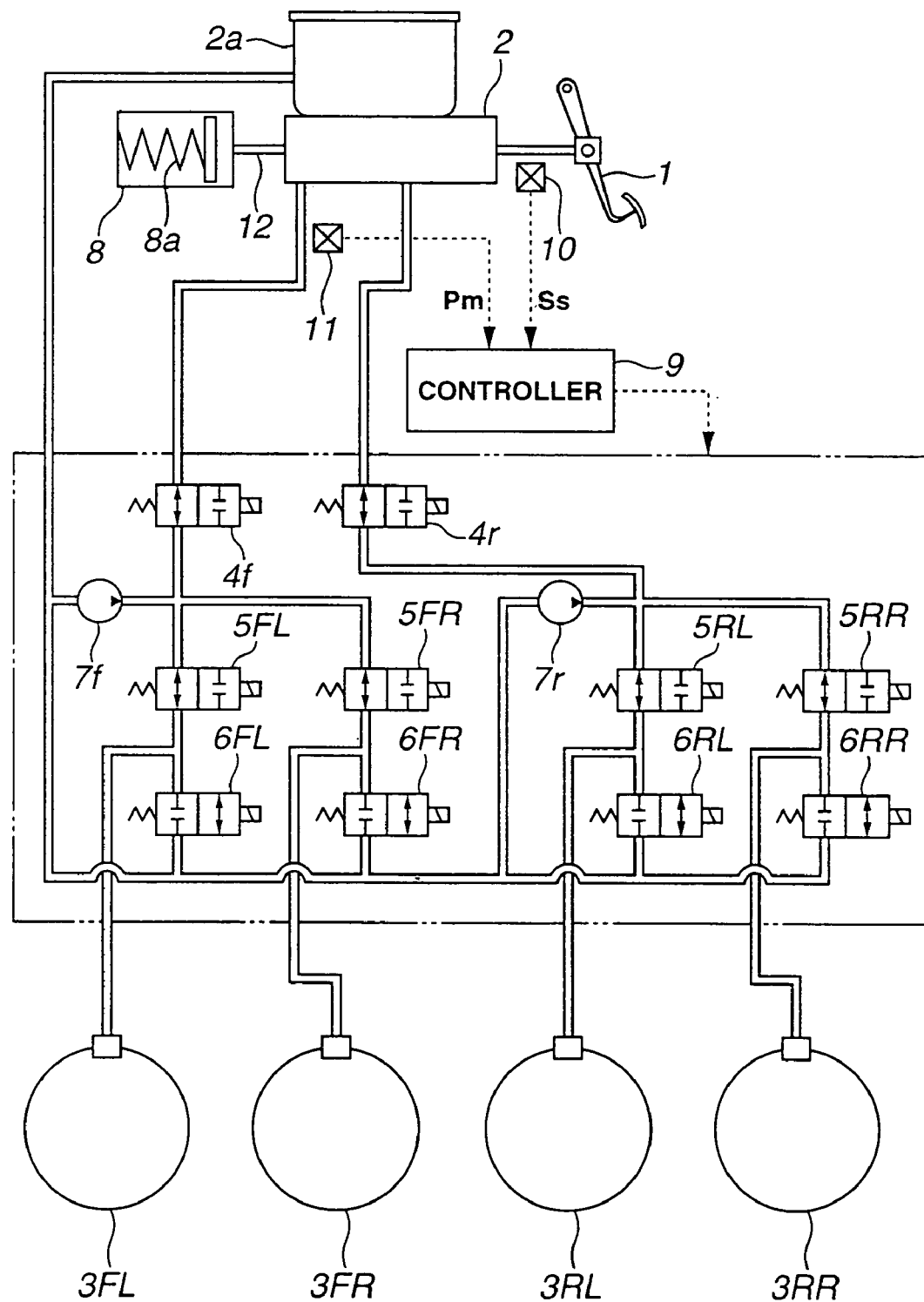
FIG. 1 is a rough configuration view of a vehicular brake system.

FIG. 1 shows a rough configuration view of a brake system. A master cylinder 2 which converts a pedal depression force exerted by a vehicle driver inputted to a brake pedal 1 (a brake input device (means)) into a liquid pressure has a primary side communicated with rear left and right wheel cylinders 3RL, 3RR and a secondary side communicated with front left and right wheel cylinders 3FL, 3FR. In this case, a front-and-rear (road wheel) split system in which the brake system is divided into front and rear road wheels is adopted in this brake system. It is of course that a front-and-rear diagonal split system which divides the brake system into front left and rear right wheel cylinders and front right and rear left wheel cylinders may be adopted in the brake system.

Each wheel cylinder 3FL through 3RR is built in a disc brake which develops a braking force by grasping a disc rotor with a brake pad under pressure or is built in a drum brake which develops the braking force by pressing a brake shoe onto an inner cylindrical surface of the brake drum under pressure. A liquid pressure system at the primary side includes: a gate valve 4r which is closable a flow passage between master cylinder 2 and wheel cylinders 3RL, 3RR; an inlet valve 5RL (or 5RR) which is closable a flow passage between gate valve 4r and wheel cylinder 3RL (or 3 RR); an outlet valve 6RL (or 6RR) which is openable a flow passage communicated between the flow passage between inlet valve 5RL (or 5RR) and wheel cylinder 3RL (3RR) and a reservoir tank 2a of master cylinder 2; and a pump 7r whose suction side is communicated between outlet valve 6RL (or 6RR) and reservoir tank 2a and whose drain side is communicated between gate valve 4r and inlet valve 5RL (or 5RR).

It is noted that each of gate valve 4r, inlet valves 5RL, 5RR, and outlet valves 6RL, 6RR is of a two-port-and-two-position switching spring offset type electromagnetic operating valve. Each of gate valve 4r and inlet valves 5RL, 5RR opens the flow passage at a normal position thereof in a non-excitation state. Outlet valve 6RL (or 5RR) closes the flow passage at the normal position thereof in the non-excitation state. It is also noted that, since each valve can open or close the flow passage, each valve of gate valve 4r and inlet valve 5RL (or 5RR) may open the flow passage at an offset position in an excitation state and outlet valves 6RL, 6RR may close the flow passage at the offset position in the excitation state.

In addition, pump 7r is constituted by a volume type pump such as a gear pump, a piston pump which can secure a substantially constant drain quantity regardless of a load pressure. In the above-described structure, with inlet valve 5RL (5RR) and outlet valve 6RL (or 6RR) at the normal position in the non-excitation state, gate valve 4r is excited and closed and pump 7r is driven. Thus, the brake liquid in reservoir tank 2a is sucked by pump 7r and its drain pressure of pump 7r permits the liquid pressure of wheel cylinder 3RL (or 3RR) to be increased.

With outlet valve 6RL (or 6RR) at the normal position in the non-excitation state, gate valve 4r and inlet valve 5RL (or 5RR) excited to close the respective flow passages, the respective flow passages from wheel cylinder 3RL (or 3RR) to reservoir tank 2a and to pump 7r are shut off to enable holding of the liquid pressure in wheel cylinder 3RL (or 3RR). Furthermore, outlet valve 6RL (or 6RR) is excited to open the flow passage and gate valve 4r and inlet valve 5RL (or 5RR) are excited to close gate valve 4r and inlet valve 5RL (or 5RR), respectively. Thus, the liquid pressure of wheel cylinder 3RL (or 3RR) can open to reservoir tank 2a to decrease the liquid pressure.

Furthermore, with all of gate valve 4r, inlet valve 5RL (or 5RR), and outlet valve 6RL (or 6RR) set to the normal position in the non-exciting state, the liquid pressure from master cylinder 2 is transmitted to wheel cylinder 3RL (or 3RR) and provides an ordinary brake. It is noted that, in the liquid pressure system at the secondary side, the same gate valve 4f, inlet valve 5FL (or 5FR), outlet valve 6FL, 6FR, and pump 7f are installed. Since the respective valve operations are the same as the primary side, the detailed description will herein be omitted.

A stroke simulator 8 is connected to the secondary side of master cylinder 2. This stroke simulator 8 is constituted by a spring type accumulator in which a compression spring 8a is intervened between a bottom portion of the cylinder and the piston. Along with a rise in the liquid pressure, compression spring 8a is elastically shrunk (compressed) so as to generate an appropriate pedal stroke and pedal reaction force for the brake operation by the vehicle driver.

A controller 9 drivingly controls gate valves 4f, 4r, inlet valves 5FL through 5RR, outlet valves 6FL through 6RR, and pumps 7f, 7r. This controller 9, at an ordinary time, executes a braking force control procedure shown in FIG. 2 so as to performs the brake-by-wire, namely, a braking force control on the basis of a pedal stroke quantity Ss detected by a stroke sensor 10 (a stroke quantity detecting section (means) and a master cylinder pressure Pm detected by a pressure sensor 11 (a pressure detecting section (means)) with gate valves 4f, 4r closed and, at a fail-safe time due to a failure of pump 7r or so on, opens gate valves 4f, 4r so that the liquid pressure from master cylinder 2 is transmitted to wheel cylinders 3FL through 3RR to provide the ordinary brake.

Figure 2:
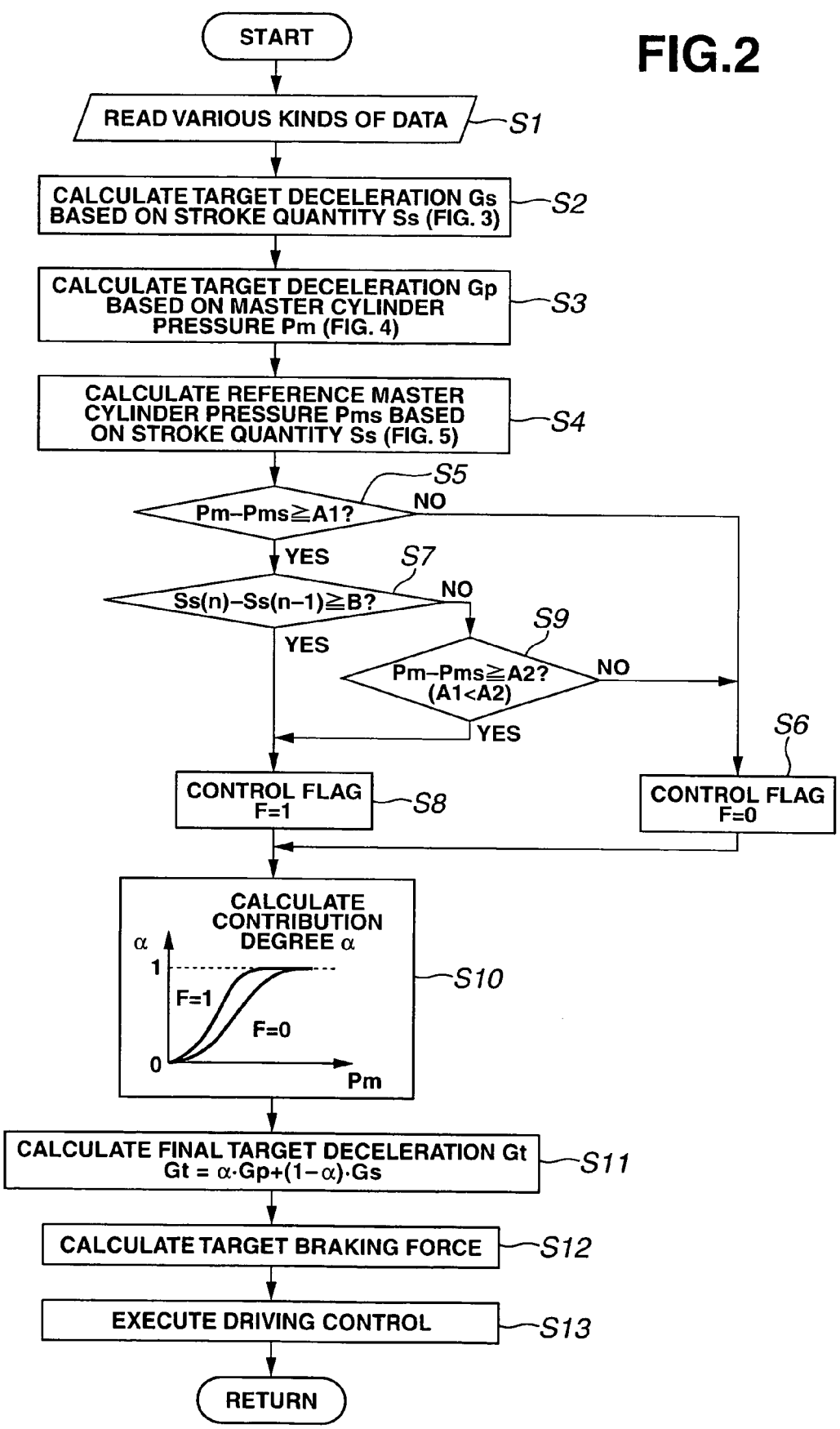
FIG. 2 is a flowchart for explaining a braking force control procedure executed in a first preferred embodiment of a vehicular braking force control apparatus according to the present invention.
Figure 3:
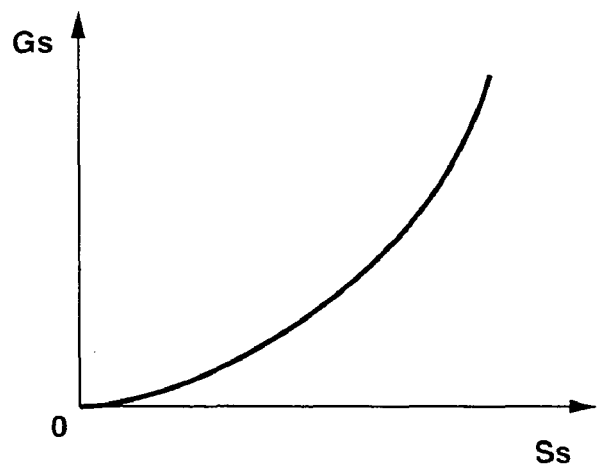
FIG. 3 is a characteristic graph representing a control map used for a calculation of a target deceleration Gs for a stroke quantity Ss.

Next, the braking force control procedure in the first preferred embodiment executed by controller 9 will be described on the basis of a flowchart shown in FIG. 2. This braking force control procedure is executed as a timer interrupt processing for each predetermined time (for example, 10 milliseconds). As shown in FIG. 2, at a first step S1, controller 9 reads stroke quantity Ss and master cylinder pressure Pm. At the subsequent step S2, controller 9 refers to the control map in FIG. 3 and calculates a target deceleration Gs on the basis of stroke quantity Ss. The control map is, as shown in FIG. 3, set in such a manner that, with stroke quantity Ss taken along a lateral axis and with target deceleration Gs taken along a longitudinal axis, target deceleration Gs is increased from zero (0) when stroke quantity Ss is increased from zero (0) and, as stroke quantity Ss becomes larger, an increase rate of target deceleration Gs becomes larger.

Figure 4:
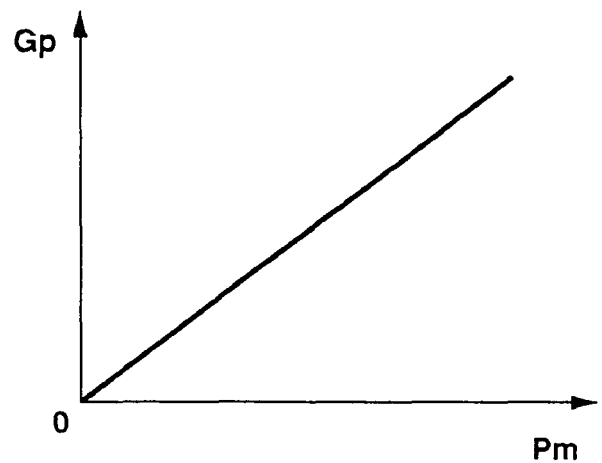
FIG. 4 is a characteristic graph representing a control map used for a calculation of another target deceleration Gp for a master cylinder pressure Pm.
Figure 5:
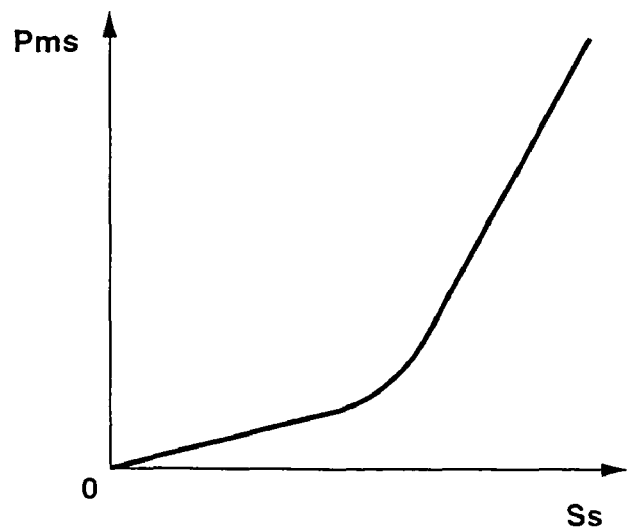
FIG. 5 is a characteristic graph representing a control map used for a calculation of a reference master cylinder pressure Pms.

At the subsequent step S3, controller 9 refers to the control map shown in FIG. 4 and calculates target deceleration Gp on the basis of master cylinder pressure Pm. The control map is set, as shown in FIG. 4, in such a manner that, with master cylinder pressure Pm taken along the lateral axis and with target deceleration Gp taken along the longitudinal axis, target deceleration Gp is proportionally increased when master cylinder pressure Pm is increased from 0. At the subsequent step S4, controller 9 refers to a control map shown in FIG. 5 and calculates a reference master cylinder pressure Pms from stroke quantity Ss. The control map is set in such a manner that, as shown in FIG. 5, with stroke quantity Ss taken along the lateral axis and with reference master cylinder pressure Pms taken along the longitudinal axis, as stroke quantity Ss becomes larger, the increase rate of reference master cylinder pressure Pms becomes larger.

At the subsequent step S5, controller 9 determines whether a deviation (Pm−Pms) between master cylinder pressure Pm and reference master cylinder pressure Pms is equal to or larger than a predetermined value A1. A flow passage 12 communicated between master cylinder 2 and stroke simulator 8 mainly provides an orifice for a brake liquid caused to flow from master cylinder 2 to stroke simulator 8. Hence, as brake pedal 1 is abruptly depressed desiring a large deceleration by the vehicle driver, a stream speed of the brake liquid caused to flow from master cylinder 2 to stroke simulator 8 is limited due to a flow passage resistance of flow passage 12 at an initial stage of the brake pedal depression. Hence, master cylinder pressure Pm becomes accordingly larger than a case where the vehicle driver gradually depresses brake pedal 1.

Hence, if a result of determination at step S5 indicates (Pm−Pms)<A1, controller 9 determines that a flow passage resistance of flow passage 12 is not increased and the driver does not depress the brake pedal abruptly (not the abrupt brake operation) and the routine goes to a step S6. At step S6, a control flag F is reset to "0". On the other hand, if the determination result is (Pm−Pms)≧A1 at step S5, controller 9 determines that the flow passage resistance of flow passage 12 is being increased and determines that there is a possibility that the driver performs the abrupt brake operation and the routine goes to a step S7.

At step S7, controller 9 determines whether a variation rate $(SS_{(n)}-SS_{(n-1)})$ from stroke quantity $Ss_{(n-1)}$ before one sampling time of sampled present stroke quantity $SS_{(n)}$ (n=natural number) is equal to or larger than a predetermined value B. If this determination result at step S7 indicates $(SS_{(n)}-SS_{(n-1)})$ ≧B, controller 9 determines that a variation speed of stroke quantity Ss is equal to or larger than the predetermined value and determines that there is a possibility that the vehicle driver performs the abrupt brake operation and the routine goes to a step S8. At step S8, controller 9 sets control flag F to "1". On the other hand, if the result of determination indicates $(Ss_{(n)}-SS_{(n-1)})$<B at step S7, controller 9 determines that the variation speed of stroke quantity Ss is smaller than predetermined value B and determines that there is a possibility that the vehicle driver does not perform the abrupt brake operation and the routine goes to a step S9.

At step S9, controller 9 determines whether deviation (Pm−Pms) between master cylinder pressure Pm and reference master cylinder pressure Pms is equal to or larger than another predetermined value A2. It is noted that predetermined value A2 is larger than previously described predetermined value A1. If the result of determination at step S9 indicates that (Pm−Pms)<A2, controller 9 determines that the vehicle driver does not perform the abrupt operation of brake pedal 1 and the routine goes to step S6. If result of determination indicates that (Pm−Pms)≧A2 at step S9, the controller 9 determines that the vehicle driver performs the abrupt brake operation and the routine goes to step S8.

At a step S10 subsequent to step S8 or S6, controller 9 refers to a map as shown in the flowchart of FIG. 2 to calculate contribution degrees of both stroke quantity Ss and master cylinder pressure Pm on the calculation of final target deceleration Gt in accordance with master cylinder pressure Pm and a status of control flag F. The control map is set in such a manner that, with master cylinder pressure Pm taken along lateral line and with contribution degree α of master cylinder pressure Pm taken along longitudinal line, contribution degree α is increased in a range from 0 to 1 and contribution degree α of master cylinder pressure Pm becomes larger when F=1 than that when F=0.

At step S11, controller 9 calculates a final target deceleration Gt in accordance with target deceleration Gp based on master cylinder pressure Pm, target deceleration Gs based on stroke quantity Ss, and contribution degree α of master cylinder pressure Pm as shown in equation (1).

$$Gt=\alpha \cdot Gp+(1-\alpha)\cdot Gs \tag{1}$$

According to equation (1), as a value of contribution degree α becomes larger, the degree of contribution of stroke quantity Ss becomes smaller on the calculation of final target deceleration Gt. At this time, the degree of contribution of master cylinder pressure Pm becomes larger. On the contrary, as the degree of contribution α becomes smaller, the contribution degree of stroke quantity Ss on the calculation of final target deceleration Gt becomes larger and the degree of contribution of master cylinder pressure Pm becomes accordingly smaller.

At the subsequent step S12, controller 9 calculates target braking force required to achieve final target deceleration Gt. At this time, controller 9 calculates, for example, individually a front road wheel braking force and a rear road wheel braking force and ideally distributes them. At the subsequent step S13, controller 9 drivingly controls gate valves 4f, 4r, inlet valves 5FL through 5RR, outlet valves 6FL through 6FR, and pump 7f, 7r, respectively.

As described above, stroke sensor 10 corresponds to the stroke quantity detecting section (means), pressure sensor 11 corresponds to the pressure detecting section (means), a process of step S10 corresponds to a contribution degree setting section (means), and processes from step S5 through S8 correspond to an abrupt operation detecting section (means).

Next, operation, action, and advantages of the first embodiment of the braking force control apparatus will be described below. Suppose, now that an ordinary brake by wire is carried out. That is to say, with gate valves 4f, 4r closed, inlet valves 5FL through 5RR, outlet valves 6FL through 6RR, and pumps 7f, 7r are drivingly controlled and the braking force control in accordance with the brake operation by the vehicle driver is carried out.

Figure 6A:
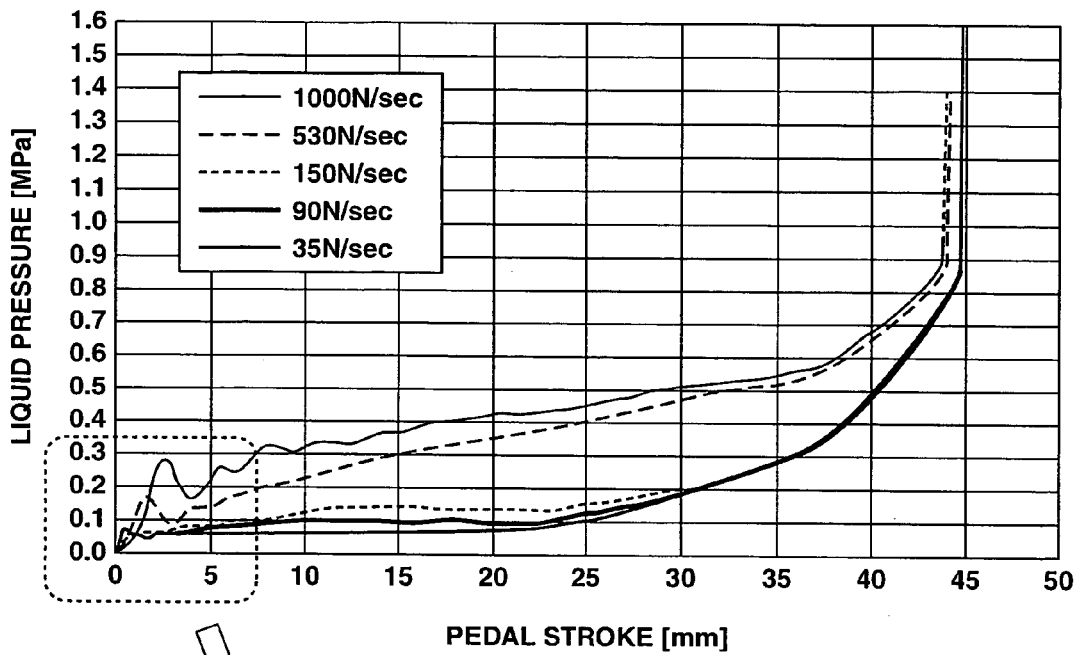
FIGS. 6A and 6B are integrally a characteristic graph representing a characteristic of a stroke simulator.
Figure 6B:
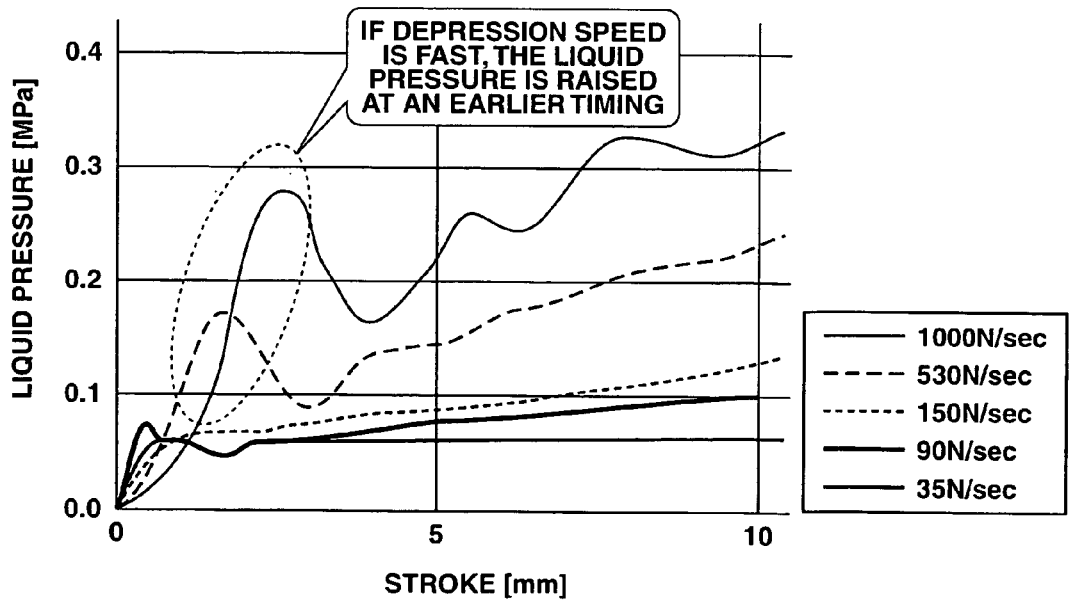

That is to say, controller 9 calculates target deceleration Gs based on stroke quantity Ss and target deceleration Gp based on master cylinder pressure Pm (steps S2 and S3), calculates final target deceleration Gt based on these final deceleration Gs and Gp (step S11), and performs the braking force control in accordance with this final target deceleration Gt (steps S12 and S13). A characteristic of stroke simulator 8 is, as shown in FIGS. 6A and 6B, as vehicle driver, desiring a large deceleration, depresses more abruptly brake pedal 1, at an initial stage of the pedal depression, the stream speed of the brake liquid flowing from master cylinder 2 to stroke simulator 8 is limited due to the flow passage resistance of flow passage 12. Hence, master cylinder pressure Pm becomes larger than the case where the vehicle driver depresses brake pedal gradually. In addition, the pedal stroke does not become larger than desired.

Figure 7A:
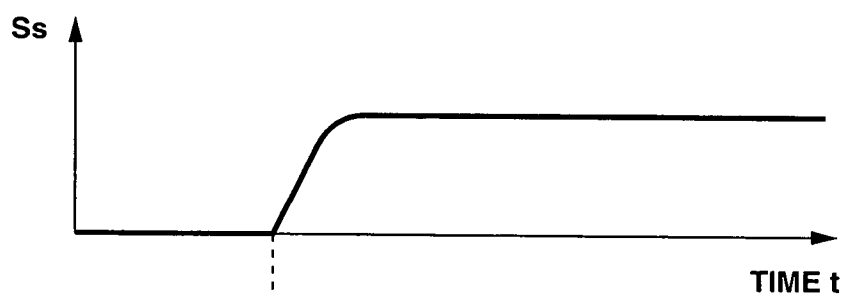
FIGS. 7A, 7B, and 7C are integrally a timing chart for explaining a problem of a comparative example to the first embodiment of the vehicular braking force control apparatus.
Figure 7B:
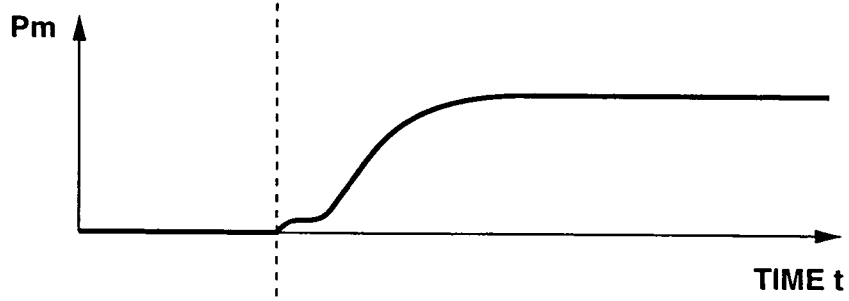
Figure 7C:
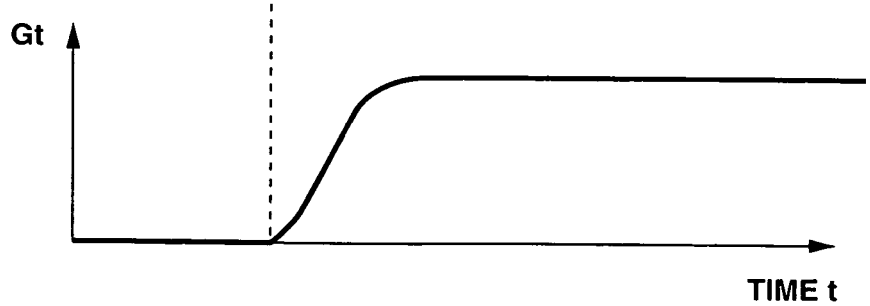

Therefore, at the initial stage of pedal depression at which the driver performs the abrupt brake operation, the degree of contribution of stroke quantity Ss becomes large and final target deceleration Gt is calculated. At this time, the degree of contribution of the increase of master cylinder pressure Pm on the increase in final target deceleration Gt becomes low. Consequently, as shown in FIGS. 7A through 7C which show an operation of a comparative example in the case where the degree of contribution of the increase in the master cylinder pressure Pm on the increase in the final target deceleration Gt becomes low as described above to the first embodiment, although the vehicle driver depresses brake pedal 1 abruptly desiring the large deceleration, brake pedal 1 does not stroke as desired due to the flow passage resistance of flow passage 12. At the initial stage of the pedal depression of brake pedal 1, final target deceleration Gt is not increased (refer to FIG. 7C) to a degree that the vehicle driver desires and the driver's intention cannot accurately be reflected.

Thus, degree of contribution a of master cylinder pressure Pm on the calculation of final deceleration Gt is set to become larger when the abrupt brake operation by the vehicle driver is detected (when control flag F is set to "1") than that when the driver's abrupt brake operation is not detected (no abrupt brake operation is detected) (when control flag F is reset to "0") and contribution degree $\alpha$ of master cylinder pressure Pm used for the calculation of the final target deceleration Gt becomes larger as master cylinder pressure Pm becomes larger. In other words, degree of contribution of master cylinder pressure Pm becomes increased (step S10).

Figure 8:
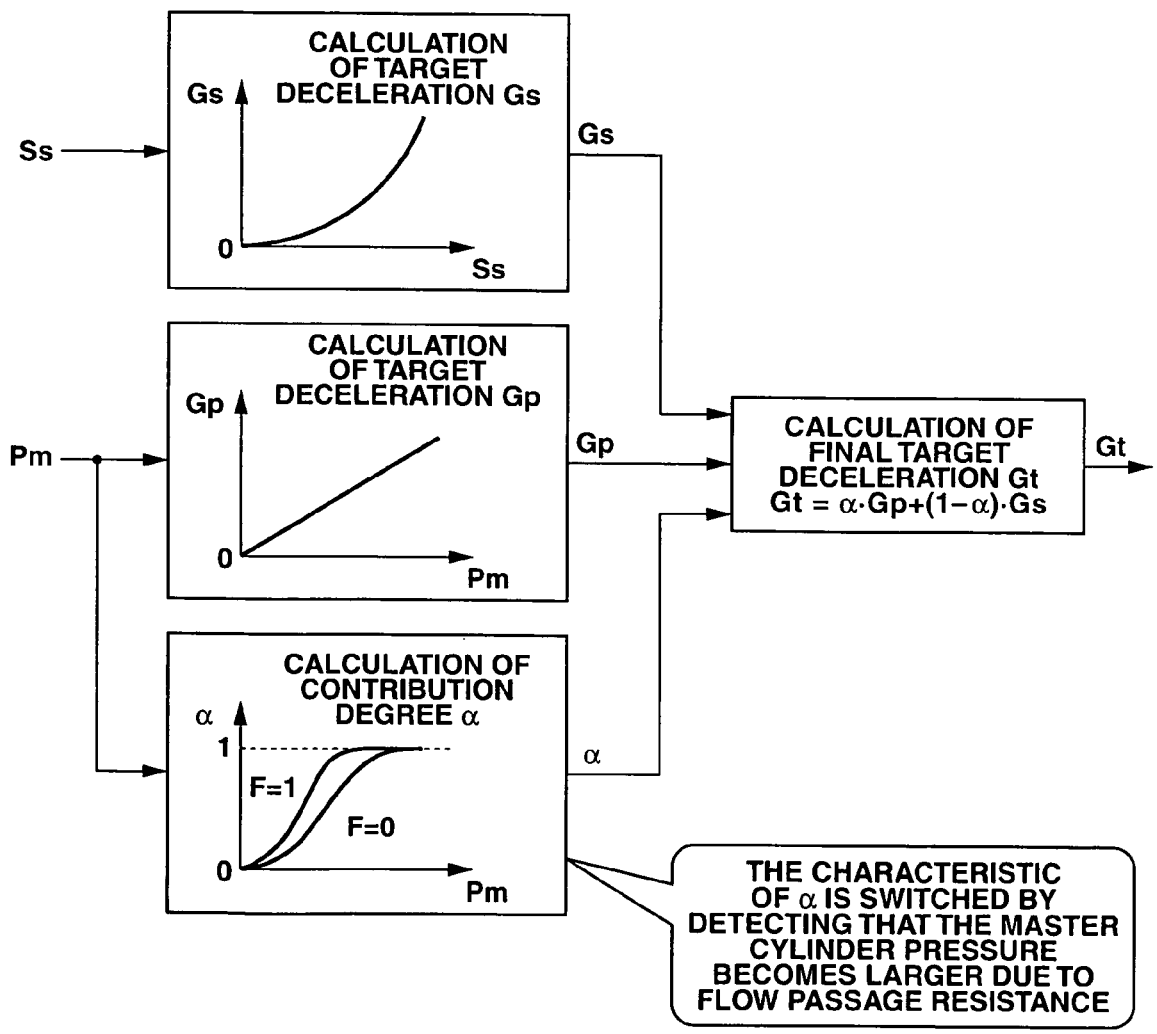
FIG. 8 is a block diagram representing a calculation processing of a final target deceleration Gt.
Figure 9A:
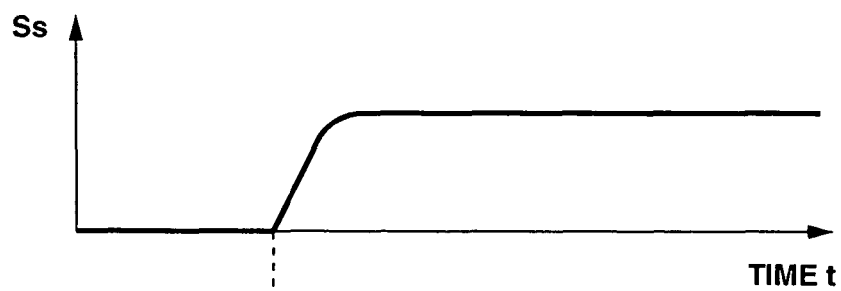
FIGS. 9A, 9B, and 9C are integrally a timing chart for explaining an advantage of the first embodiment of the vehicular braking force control apparatus according to the present invention to be compared with the timing chart of FIGS. 7A through 7C.
Figure 9B:
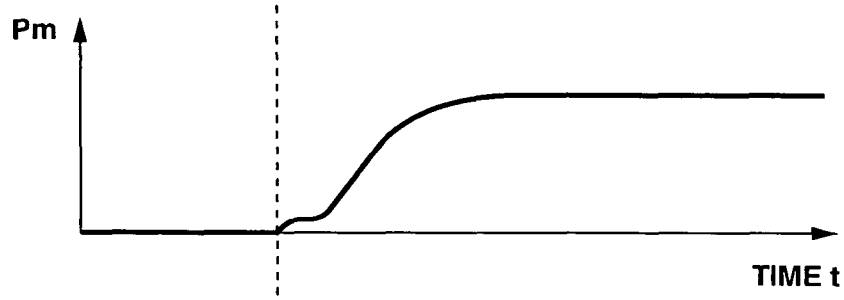
Figure 9C:
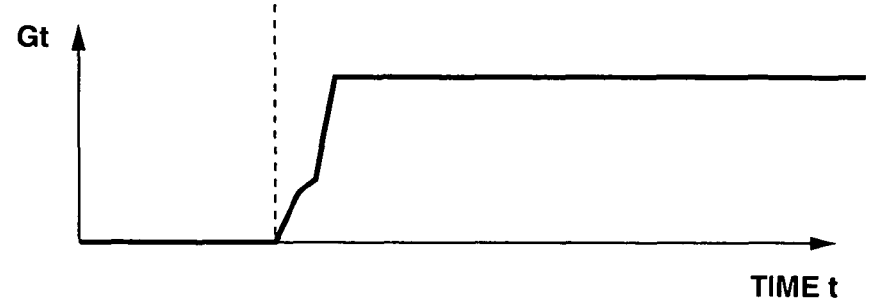

It is noted that the calculation processing of final target deceleration Gt in the first embodiment is shown in FIG. 8. Thus, as shown in FIGS. 9A through 9C (particularly FIG. 9C), when master cylinder pressure Pm becomes larger due to the execution of the abrupt brake operation by the vehicle driver, a rising of final target deceleration Gt is improved. By reducing an arrival time at a predetermined deceleration speed, a delay in the vehicular deceleration can be improved. Hence, final target deceleration Gt is increased to a value that the vehicle driver desires. From the initial stage of the brake operation, the vehicle driver's intention can accurately be reflected and an effect of braking can be exhibited at an earlier stage of the braking.

In addition, when controller 9 determines that the flow passage resistance of flow passage 12 which is a liquid pressure transmission path to master cylinder 2 is increased, controller 9 can detect that the abrupt brake operation of the vehicle driver occurs. This abrupt brake operation can, thus, accurately be detected. That is to say, controller 9 calculates reference master cylinder pressure Pms in accordance with stroke quantity Ss detected by stroke sensor 10 at step S4. If deviation (Pm−Pms) between reference master cylinder pressure Pms and master cylinder pressure Pm detected by pressure sensor 11 is equal to or larger than predetermined value A1 (Yes of the determination at step S5), controller 9 can easily and accurately determine that the abrupt brake operation by the vehicle driver occurs due to the determination that the flow passage resistance of flow passage 12 is increased.

Furthermore, when the increase speed of stroke quantity Ss detected by stroke sensor 10, namely, variation quantity ($SS_{(n)}-SS_{(n-1)}$) of sampled stroke quantity $SS_{(n)}$ from one sampling period prior stroke quantity $SS_{(n-1)}$ is equal to or lager than predetermined value B (Yes at step S7), controller 9 determines the abrupt operation of brake by the vehicle driver. Hence, the abrupt operation of the brake can easily and accurately be detected.

On the other hand, when controller 9 detects no abrupt brake operation (when control flag F is reset to "0", degree of contribution $\alpha$ used for the calculation of final target deceleration Gt becomes smaller than that when controller 9 detects that the abrupt brake operation by the vehicle driver (when control flag F is set to "1") and contribution degree $\alpha$ becomes smaller as master cylinder pressure Pm becomes lower, namely, the contribution degree of stroke quantity Ss becomes larger (step S10). Thus, the braking force control in accordance with the general tendency of the vehicle driver to try to adjust the pedal stroke mainly at the initial stage of the pedal depression can be performed.

When a pump failure, for example, is detected from a state in which the brake-by-wire is performed, a fail safe structure causes gate valve 4f, 4r to be opened and the liquid pressure of master cylinder 2 causes the braking force to be developed. It is noted that, in the first embodiment described above, the process at step S10 causes degree of contribution $\alpha$ to be varied in accordance with master cylinder pressure Pm continuously and at an unlimited stage. The present invention is not limited to this. The degree of contribution $\alpha$ may be varied in a stepwise manner in accordance with master cylinder pressure Pm or may be varied at one stage. Furthermore, degree of contribution $\alpha$ is varied non-linearly (in a curve shape manner) in accordance with the variation of master cylinder pressure Pm. However, the present invention is not limited to this. The degree of contribution $\alpha$ may linearly be varied in proportion to the variation in master cylinder pressure Pm.

In addition, degree of contribution $\alpha$ is exemplified as a distribution percentage (a distribution ratio). A sum of $\alpha$ and $(1-\alpha)$ may not always be constant. For example, such a form that one of the degrees of contributions is increased but the other degree of contribution is unchanged and the sum may accordingly be increased. In addition, in the first embodiment, degree of contribution $\alpha$ is calculated only in accordance with master cylinder pressure Pm at the process of step S10. The present invention is not limited to this. That is to say, degree of contribution $\alpha$ may be calculated only in accordance with stroke quantity Ss and may be calculated in accordance with both of stroke quantity Ss and master cylinder pressure Pm. In addition, although the vehicle driver's abrupt brake operation is detected by an AND condition between the determination processing of step S5 and the determination processing of step S7. The present invention is not limited to this. An OR condition may be used.

Figure 10:
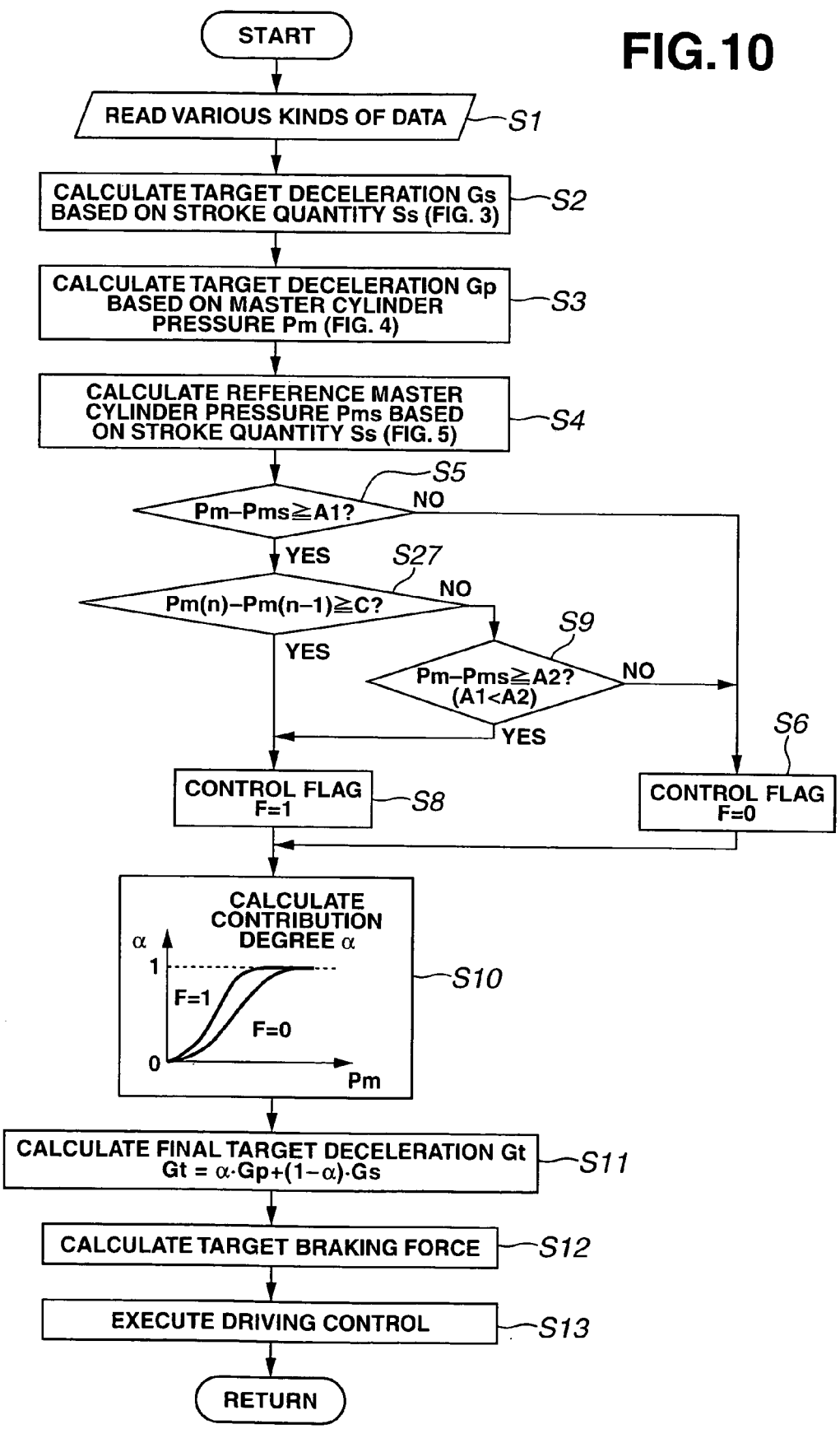
FIG. 10 is a flowchart for explaining another example of the vehicular braking force control procedure executed in an alternative of the first embodiment of the vehicular braking force control apparatus according to the present invention.

If, in the first preferred embodiment described above, at the processing of step S7, variation rate (quantity) $(SS_{(n)}-SS_{(n-1)})$ from stroke quantity $Ss_{(n-1)}$ before one sampling period of sampled stroke quantity $SS_{(n)}$ is equal to or larger than predetermined value B, in other words, the variation speed of stroke quantity Ss is equal to or larger than the predetermined value, controller 9 determines that the abrupt brake operation by the vehicle driver occurs. However, the present invention is not limited to this. The process at step S7 may be modified to a new step S27 as shown in FIG. 10. That is to say, if a variation rate (quantity) $(Pm_{(n)}-Pm_{(n-1)})$ from master cylinder pressure $Pm_{(n-1)}$ before one sampling period of sampled present master cylinder $Pm_{(n)}$ is equal to or larger than a predetermined value C, in other words, if a variation speed of master cylinder pressure Pm is equal to or larger than the predetermined value, controller 9 may determine that the abrupt brake operation by the vehicle driver occurs. Thus, the vehicle driver's abrupt brake operation can accurately and easily be detected in the same way in the braking force control procedure shown in FIG. 2.

In the first embodiment, a hydraulic brake system in which the liquid pressure is a medium of the transmission is adopted. However, the present invention is not limited to this. An air brake system in which a compressed air is the medium of transmission may be adopted. Furthermore, in the first embodiment, the brake-by-wire utilizing a fluid pressure is carried out. However, the present invention is not limited to this. Since the braking force control can be carried out, on the brake-by-wire, any brake may be adopted if an electronically controllable energy source such as an electrically operated brake in which an electrically motor operated actuator is drivingly controlled to grasp the disc rotor with the brake pad under pressure and to press a brake shoe on an inner peripheral surface of brake drum under pressure or a regenerative motor brake is provided.

Next, a second preferred embodiment of the braking force control apparatus according to the present invention will be described on the basis of FIGS. 11 through 13. The specific structure of the braking force control apparatus in the second embodiment is the same as that in the first embodiment. In the second embodiment of the braking force control apparatus according to the present invention, degree of contribution α of master cylinder pressure Pm on the calculation of final target deceleration Gt when controller 9 predicts that the abrupt brake operation by the driver occurs is made larger than that when controller 9 does not predict that the abrupt brake operation by the driver occurs. Thus, in the second embodiment, except that the braking force control procedure in FIG. 2 is modified to the braking force control procedure shown in FIGS. 11 and 12, the same processing as described in the first embodiment is executed. It is noted that the detailed description of the same reference numeral steps as those shown in FIG. 2 will be omitted herein.

Figure 11:
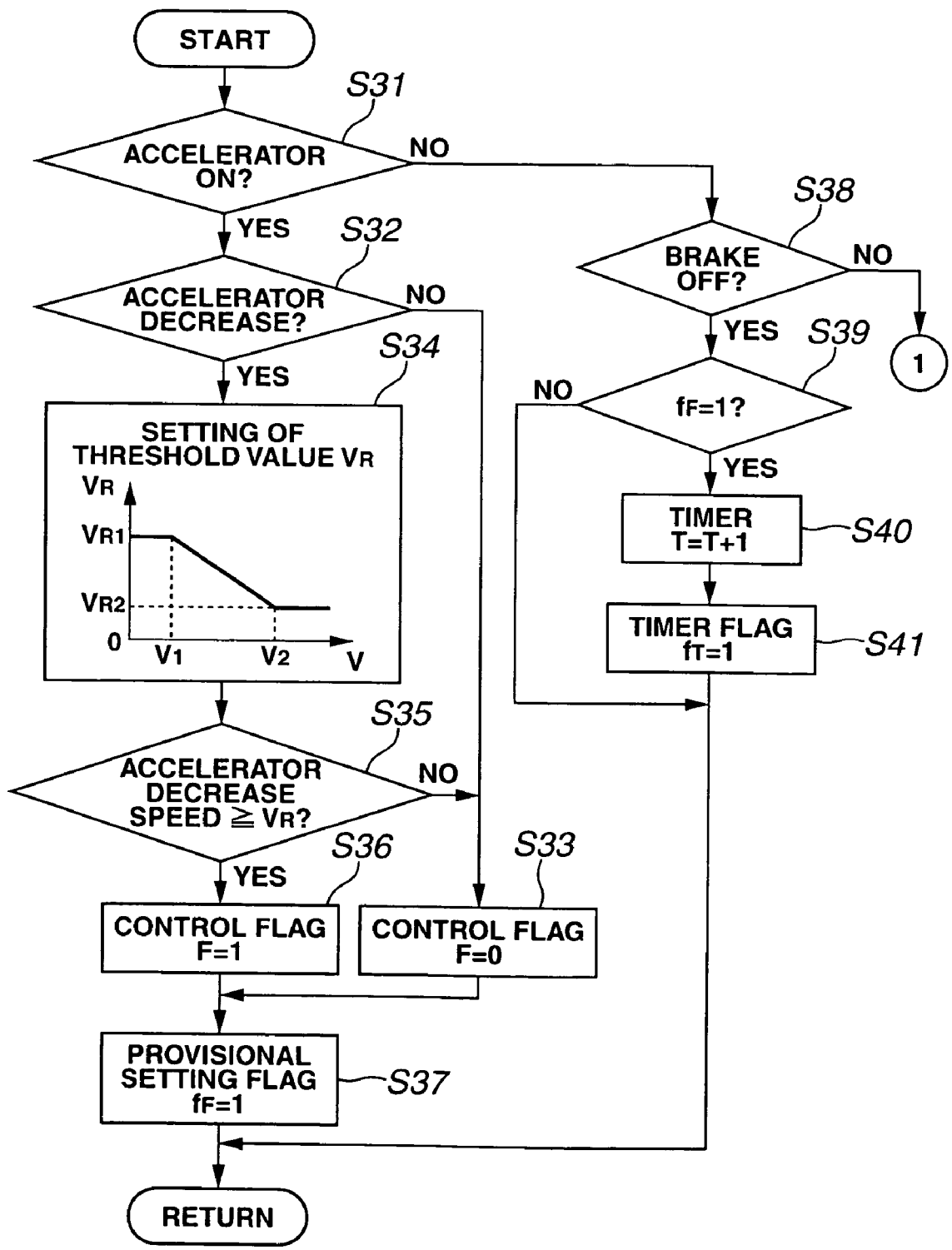
FIG. 11 is a flowchart for explaining the braking force control procedure executed in a second preferred embodiment of the vehicular braking force control apparatus (when accelerator is ON or when brake is OFF with accelerator OFF) according to the present invention.

First, at step S31 in FIG. 11, controller 9 determines whether the accelerator is ON, namely, an accelerator operation by the vehicle driver is carried out. If accelerator operation is not carried out (No) at step S31, the routine goes to a step S38 which will be described later. On the other hand, if the accelerator operation is carried out (accelerator ON), the routine goes to a step S32. At step S32, controller 9 determines whether an accelerator manipulated variable is decreased or not, namely, whether an accelerator release operation occurs. If controller 9 determines that no accelerator release operation occurs at step S32 (No), the routine goes to a step S33. On the other hand, if controller 9 determines that the accelerator release operation occurs (Yes) at step S32, the routine goes to a step S34. At step S33, controller 9 resets control flag F to "0" and the routine goes to a step S37.

At step S34, controller 9 refers to a control map shown in the flowchart of FIG. 11 in which a threshold value $V_R$ for accelerator decrease speed is set in accordance with vehicle speed V. This control map is set in such a manner that, with vehicle speed V taken along the lateral axis and threshold value $V_R$ taken along the longitudinal axis, threshold value $V_R$ is maintained at $V_{R1}$ (for example, 500 mm/sec) when vehicle speed V is lower than $V_1$ (for example, 20 Km/h), threshold value $V_R$ is decreased between $V_{R1}$ and $V_{R2}$ (for example, 200 mm/sec) when vehicle speed V is increased between $V_1$ and $V_2$ (for example, 60 Km/h), and threshold value $V_R$ is maintained at $V_{R2}$ when vehicle speed V is in excess of $V_2$. It is noted that $V_{R1}$ is a maximum release (return) speed determined according to the structure of an accelerator pedal (the accelerator), namely, a value corresponding to a returning speed for the accelerator pedal to be returned to a released position by means of a return spring after a depression force of the accelerator pedal is released and may have a margin to such a degree about −10%.

At the next step S35, controller 9 determines whether the accelerator decrease speed is equal to or larger than threshold value $V_R$. It is noted that the accelerator decrease speed is calculated from a variation rate from the value one sampling time before the accelerator manipulation variable. It is noted that the result of determination is that the accelerator decrease speed $<V_R$ (No) at step S35, controller 9 determines that the abrupt accelerator release operation by the vehicle driver is not carried out. Hence, controller 9 predicts that the subsequent abrupt brake operation is not carried out and the routine goes to step S33. On the other hand, if the result of determination at step S35 is that accelerator decrease speed $\geq V_R$, controller 9 determines that the driver's abrupt accelerator return (release) operation is carried out and predicts that the subsequent abrupt brake operation is carried out and the routine goes to a step S36.

At step S36, controller 9 sets control flag F to "1" and the routine goes to step S37. At step S37, controller 9 sets a provisional setting flag $f_F$ indicating a provisional setting state of control flag F to "1" and the routine returns to a predetermined main program. On the other hand, at step S38, controller 9 determines whether the brake is OFF, namely, the brake operation is not carried out. If the brake operation is carried out (No), the routine goes to a step S51 shown in FIG. 12 which will be described later. On the other hand, if the brake operation is not present (Yes), the routine goes to a step S39.

At step S39, controller 9 determines whether provisional setting flag $f_F$ is set to "1". If the result of determination is $f_F=0$, controller 9 determines that the accelerator operation is naturally not carried out after, for example, an ignition switch is turned to ON and the routine is returned to the predetermined main program. On the other hand, if result of determination is $f_F=1$, controller 9 determines that it (the present time) is after the accelerator operation is released and the routine goes to a step S40.

At step S40, controller 9 counts a time from a time at which the accelerator operation is released to a time at which the brake operation is started by means of a timer T (T=T+1). At the subsequent step S41, controller 9 sets a timer flag $f_T$ indicating a count start state by means of timer T to "1" to indicate the count start state by means of timer T and the routine is returned to the predetermined main program. On the other hand, at step S51 in FIG. 12, controller 9 determines whether timer flag $f_T$ is set to "1". If the result of determination at step S51 is $f_T=0$, controller 9 determines that this brake operation is not the brake operation after the accelerator operation is released and the routine goes to a step S59 which will be described later. On the other hand, if the result of determination at step S51 is $f_T=1$ (Yes), controller 9 determines that this brake operation is the brake operation after the release of the accelerator operation and the routine goes to a step S52.

Figure 12:
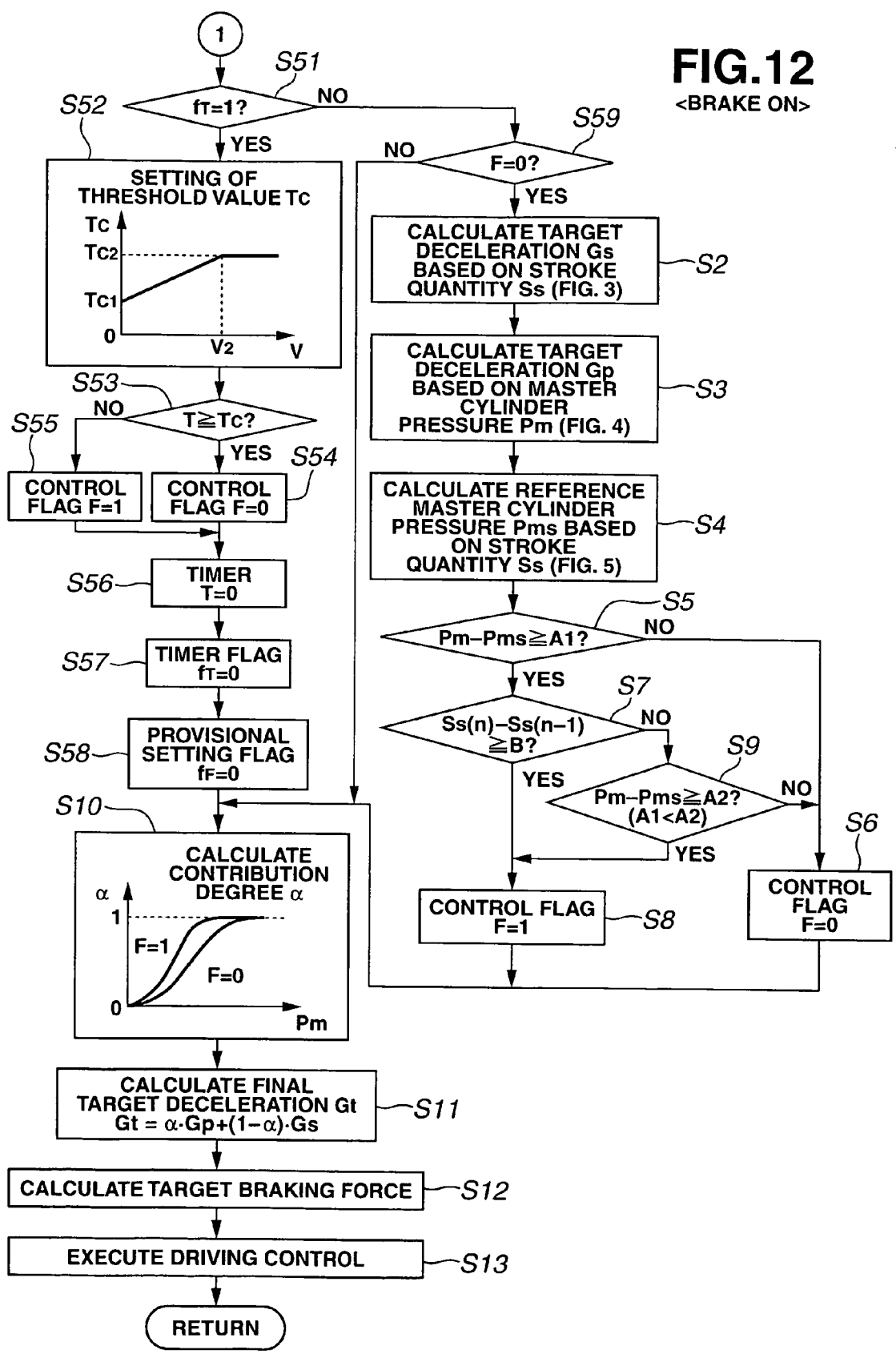
FIG. 12 is another flowchart continued from the flowchart of FIG. 11 and representing the braking force control procedure (when brake is ON) executed in the second preferred embodiment of the vehicular braking force control apparatus according to the present invention.
Figure 13:
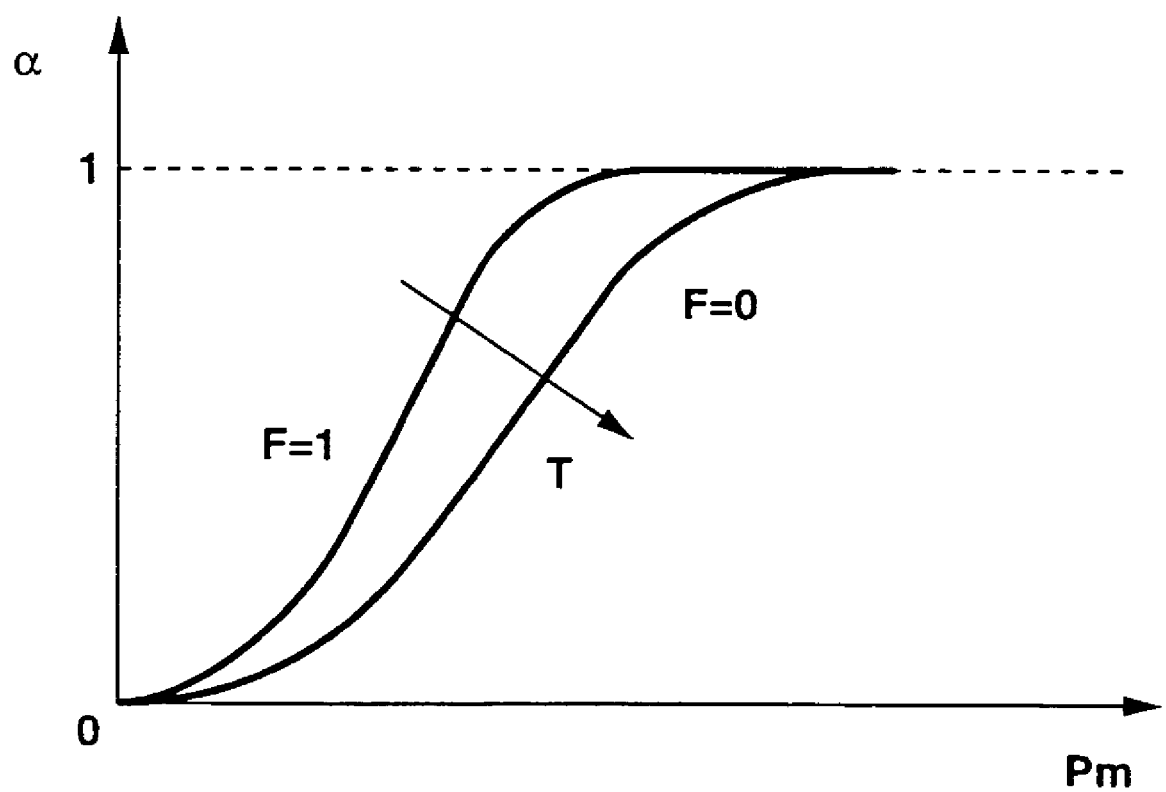
FIG. 13 is a characteristic graph representing a control map used for a calculation of a contribution degree a as an alternative to the second embodiment.

At step S52, controller 9 refers to a control map shown in the flowchart of FIG. 12 in which threshold value $T_C$ for timer T is set in accordance with vehicle speed V. This control map is set in such a manner that, with vehicle speed V taken along the lateral axis and threshold value $T_C$ taken along the longitudinal axis, threshold value $T_C$ is increased between $T_{C1}$ (for example, 0.2 Sec.) and $T_{C2}$ (for example, 0.5 Sec,) when vehicle speed V is increased from zero to $V_2$ (for example, 60 Km/h) and threshold value $T_C$ is maintained at $T_{C2}$ when vehicle speed V is in excess of $V_2$. It is noted that Tc1 is a time required for an ordinary human being to reflectively shift a pedal depression from the accelerator pedal to brake pedal 1 and $T_{C2}$ is a time required for a human being to shift the pedal depression even if the human being has a slow response capability (a slow reflexes).

At the subsequent step S53, controller 9 determines whether the count value of timer T is equal to or longer than threshold value $T_C$. If the result of determination at step S53 is $T \geq T_C$ (Yes), the brake operation is not started instantaneously after the accelerator operation is released. Hence, controller 9 predicts that the abrupt brake operation is not carried out, the routine goes to a step S54. If the result of determination at step S53 is $T<T_C$, the brake operation is started immediately after the accelerator operation is released, hence, controller 9 predicts that the abrupt brake operation is carried out, and the routine goes to a step S55.

At step S54, controller 9 resets control flag F to "0" and the routine goes to a step 556. At step S55, controller 9 sets control flag F to "1" and the routine goes to a step S56. At step S56, timer T is reset to "0". At the subsequent step S57, timer flag $f_T$ is reset to "0". At the subsequent step S58, provisional setting flag $f_F$ is reset to "0" and the routine goes to step S10 described with reference to FIG. 2.

On the other hand, at step S59, controller 9 determines whether control flag F is reset to "0". If the result of determination is F=1 (No), controller 9 already predicts that the abrupt brake operation will occur and the routine goes to step S10. On the other hand, if F=0 at step S59, controller 9 determines that there is a possibility that the abrupt brake operation will be detected from the present time and the routine goes to step S2. As described above, processes of steps S31 through S41 in FIG. 11 and steps S51 through S57 are included in the abrupt operation detecting section (means).

Next, an operation, an action, and advantages of the second preferred embodiment of the vehicular braking force control apparatus according to the present invention will be described below. Suppose now that the abrupt accelerator release operation is carried out during the accelerator operation by the vehicle driver (Yes at step S35). Then, controller 9 predicts that the subsequent abrupt brake operation occurs and sets control flag F to "1" as a provisional setting. (step S36). In this way, at a time point at which controller 9 (beforehand) predicts that the abrupt brake operation soon occurs, degree of contribution α of master cylinder pressure Pm becomes larger. Hence, the response characteristic can be higher by a detection time rather than the response from the actual detection of the abrupt brake operation. Hence, the large deceleration that the driver-desires can accurately be assured from the initial stage of the start of the brake operation.

In addition, before the actual brake operation is carried out, at a stage where the accelerator release operation is carried out, the abrupt brake operation can be predicted. Hence, the response characteristic of the second embodiment is particularly superior. The determination of whether the abrupt brake operation occurs is carried out depending upon whether the decrease speed of the accelerator operation is equal to or larger than threshold value $V_R$. Hence, the abrupt brake operation can easily and accurately be determined. Furthermore, threshold value $V_R$ for the accelerator decrease speed is set to a smaller value as vehicle speed V becomes faster (step S34). Particularly, the response characteristic at a high speed range which gives a large influence on a braking distance can become easier to be higher. Hence, the superior response characteristic to the abrupt brake operation at the high vehicle speed range is exhibited. The large deceleration that the vehicle driver desires form the initial stage is obtained so that the braking distance can as short as possible.

Then, the time duration from the time at which the accelerator operation is released to the time at which the brake operation is started (the pedal depression shift time) is counted by means of timer T (step S40). When timer count value T at the time point at which the brake operation is started is less than threshold value $T_C$ ("No" at the determination of step S53), controller 9 predicts that the abrupt brake operation will be carried out from this time and control flag F is set to "1". (step S55).

In this case, degree of contribution α of master cylinder pressure Pm is responded to become large at a time point at which the abrupt brake operation is predicted. Hence, the response characteristic can become higher according to the detection time rather than the response to the actual detection of the abrupt brake operation. Thus, the large deceleration as the vehicle driver desires can accurately be obtained from the initial stage when the brake operation is started.

In addition, since the prediction is carried out from a time at which the brake operation is actually started, a reliability can be improved rather than a case of the prediction at the stage of the release of the accelerator operation. In addition, the determination of whether the abrupt brake operation is carried out is carried out depending upon whether the count value of timer T is shorter than threshold value $T_C$. Hence, this can easily and accurately be determined. Furthermore, threshold value $T_C$ for timer value T is set to become longer as vehicle speed V becomes faster (step S52). Especially, the response characteristic at the high speed range at which vehicle speed V gives the large influence on the braking distance becomes easier to be higher. Therefore, the superior response characteristic to the abrupt brake operation at the high speed range can be exhibited. From the initial stage, the large deceleration in the way as the vehicle driver desires is obtained. The braking distance can be shortened as short as possible.

As described above, a reliability of the prediction is improved in a case where the prediction that the abrupt brake operation occurs in accordance with the pedal depression shift time (timer T) rather than the case where the abrupt brake deceleration is carried out at the time point at which the abrupt accelerator release operation is detected. Hence, even if the abrupt accelerator release acceleration is detected, the count value of timer T is equal to or larger than threshold value $T_C$ (the determination at step S53 is Yes). At this time, control flag F previously set (provisional setting) is reset to "0" at step S54. Thus, while improving the response characteristic, the reliability of the prediction is not reduced.

It is noted that, in the second embodiment, the abrupt accelerator release operation is detected in accordance with the decrease speed of the accelerator operation. The present invention is not limited to this. For example, when the accelerator operation decrease acceleration (the decrease acceleration) is equal to or larger than a threshold value, controller 9 may detect the abrupt accelerator release operation. In addition, in the second embodiment, even if the abrupt accelerator release operation is detected, control flag F is reset to "0" when the count value of timer T is equal to or larger (longer) than threshold value $T_C$. However, the present invention is not limited to this. For example, even if timer T is equal to or larger than threshold value $T_C$, control flag F is maintained as F=1. Thus, when degree of contribution α is calculated, the control map as shown in FIG. 13 may be referred to. This control map shown in FIG. 13 is set in such a manner that as the count value of timer T becomes longer (larger), contribution degree α is set to approach from the state of F=1 to state of F=0. Thus, while following the response characteristic, the prediction reliability cannot be reduced.

Furthermore, in the second embodiment, the abrupt brake operation is predicted in accordance with the abrupt accelerator release operation and the pedal depression time (timer value T). The present invention is not limited to this. For example, the prediction of the abrupt brake operation may be carried out in accordance with a relative relationship between the vehicle and a preceding vehicle which is traveling ahead of the vehicle. That is to say, when an inter-vehicle distance from the preceding vehicle is abruptly decreased from a state in which the inter-vehicle distance is approximately constant, or when the inter-vehicle distance from the preceding vehicle is shorter than a shortest braking distance, there is a possibility that the vehicle driver carries out the abrupt brake operation. Hence, even in this case, since control flag F is set to "1", controller 9 may respond to such that degree of contribution α of master cylinder pressure Pm becomes larger. The other action, advantages, and an application range of the present invention are the same as those described in the case of the first embodiment described above.

This application is based on prior Japanese Patent Applications No. 2004-370827 filed in Japan on Dec. 22, 2004 and No. 2005-160474 filed in Japan on May 31, 2005, the disclosures of which are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A braking force control method for an automotive vehicle, comprising:
providing a brake input device manually operable by a vehicle driver;
providing a master cylinder configured to develop a master cylinder pressure in accordance with an operation of the brake input device by the vehicle driver;
setting contribution degrees of both of a stroke quantity of the brake input device and the master cylinder pressure in accordance with at least one of the stroke quantity of the brake input device and the master cylinder pressure developed in the master cylinder;
calculating a target braking force of the vehicle on the basis of the contribution degrees of both of the stroke quantity and the master cylinder pressure; and
controlling the braking force of the vehicle in accordance with the calculated target braking force, the contribution degree of the master cylinder pressure on a calculation of the target braking force being set to become larger when an abrupt brake operation by the vehicle driver is detected than the contribution degree of the master cylinder pressure when no abrupt brake operation by the vehicle driver is detected, wherein the braking force control method further comprises: detecting the stroke quantity of the brake input device; detecting the master cylinder pressure developed in the master cylinder; and detecting whether the abrupt brake operation by the vehicle driver occurs and wherein the target braking force is calculated on the basis of the stroke quantity of the brake input device, the master cylinder pressure developed in the master cylinder, and the contribution degrees of both of the stroke quantity of the brake input device and the master cylinder pressure developed in the master cylinder.

2. A braking force control apparatus for an automotive vehicle; comprising:
a brake input device manually operable by a vehicle driver;
a master cylinder configured to develop a master cylinder pressure in accordance with an operation of the brake input device by the vehicle driver;
a contribution degree setting section that sets contribution degrees of both of a stroke quantity of the brake input device and the master cylinder pressure in accordance with at least one of the stroke quantity of the brake input device and the master cylinder pressure developed in the master cylinder;
a target braking force calculating section that calculates a target braking force of the vehicle on the basis of the brake input device and the master cylinder pressure; and
a braking force control section that controls the braking force of the vehicle in accordance with the calculated target braking force, the contribution degree setting section setting the contribution degree of the master cylinder pressure on a calculation of the target braking force to become larger when an abrupt brake operation by the vehicle driver is detected than the contribution degree of the master cylinder pressure when no abrupt brake operation by the vehicle driver is detected, wherein the braking force control apparatus further comprises: a stroke quantity detecting section that detects the stroke quantity of the brake input device; a pressure detecting section that detects the master cylinder pressure developed in the master cylinder; and an abrupt operation detecting section that detects whether the abrupt brake operation by the vehicle driver occurs and wherein the target braking force calculating section calculates the target braking force on the basis of the stroke quantity of the brake input device, the master cylinder pressure developed in the master cylinder, and the contribution degrees of both of the stroke quantity of the brake input device and the master cylinder pressure developed in the master cylinder.

3. The braking force control apparatus for the automotive vehicle as claimed in claim 2, wherein the abrupt operation detecting section detects the abrupt brake operation by the vehicle driver by determining that a flow passage resistance in a fluid pressure transmission route of the master cylinder is being increased.

4. The braking force control apparatus for the automotive vehicle as claimed in claim 3, wherein the abrupt operation detecting section calculates a reference master cylinder pressure in accordance with the stroke quantity detected by the stroke quantity detecting section and determines that the flow passage resistance in the fluid pressure transmission route of the master cylinder is being increased when a deviation between the reference master cylinder pressure and the master cylinder pressure detected by the pressure detecting section is equal to or larger than a predetermined value.

5. The braking force control apparatus for the automotive vehicle as claimed in claim 2, wherein the abrupt operation detecting section detects the abrupt brake operation by the vehicle driver by an increase speed of the master cylinder pressure detected by the pressure detecting section being equal to or larger than a predetermined value.

6. The braking force control apparatus for the automotive vehicle as claimed in claim 2, wherein the abrupt operation detecting section detects the abrupt brake operation by the vehicle driver by an increase speed of the stroke quantity detected by the stroke quantity detecting section being equal to or larger than a predetermined value.

7. The braking force control apparatus for the automotive vehicle as claimed in claim 2, wherein the abrupt operation detecting section detects the abrupt brake operation by the vehicle driver by predicting that the abrupt brake operation by the vehicle driver occurs.

8. The braking force control apparatus for the automotive vehicle as claimed in claim 7, wherein the abrupt operation detecting section predicts that the abrupt brake operation by the vehicle driver occurs when detecting an abrupt accelerator release operation by the vehicle driver.

9. The braking force control apparatus for the automotive vehicle as claimed in claim 8, wherein the abrupt operation detecting section detects the abrupt accelerator release operation by the vehicle driver when either one or both of a speed of an accelerator release operation and an acceleration of the accelerator release operation being equal to or larger than a predetermined threshold value.

10. The braking force control apparatus for the automotive vehicle as claimed in claim 9, wherein the predetermined threshold value is set to become smaller as a vehicle speed becomes faster.

11. The braking force control apparatus for the automotive vehicle as claimed in claim 8, wherein, when the contribution degree setting section, in response to a prediction of the abrupt operation detecting section that the abrupt brake operation occurs in accordance with the abrupt accelerator release operation by the vehicle driver, sets the contribution degree of the master cylinder pressure on the calculation of the target braking force to be larger, the degree of contribution of the master cylinder pressure on the calculation of the target braking force approaches more to a state when the abrupt operation detecting section does not predict that the abrupt brake operation by the vehicle driver occurs as a time duration from a time at which the accelerator operation by the vehicle driver is released to a time at which the brake operation by the vehicle driver is started becomes longer.

12. The braking force control apparatus for the automotive vehicle as claimed in claim 7, wherein the abrupt operation detecting section predicts that the abrupt brake operation by the vehicle driver occurs when a time duration from a time at which the accelerator operation by the vehicle driver is released to a time at which the brake operation by the vehicle driver is started is shorter than a predetermined threshold value.

13. The braking force control apparatus for the automotive vehicle as claimed in claim 12, wherein the predetermined threshold value is set to be longer as the vehicle speed becomes faster.

14. The braking force control apparatus for the automotive vehicle as claimed in claim 2, wherein the braking force control apparatus further comprises: a first target deceleration calculating section that calculates a first target deceleration (Gs) on the basis of the stroke quantity (Ss) detected by the stroke quantity detecting section; a second target deceleration calculating section that calculates a second target deceleration (Gp) on the basis of the master cylinder pressure (Pm) detected by the pressure detecting section; and a reference master cylinder pressure calculating section that calculates a reference master cylinder pressure (Pms) on the basis of the stroke quantity (Ss) detected by the stroke quantity detecting section, wherein the abrupt operation detecting section comprises a control flag setting section that sets a control flag (F) to "1" when detecting the abrupt brake operation by the vehicle driver and resets the control flag (F) to "0" when detecting no abrupt brake operation by the vehicle driver, and wherein the contribution degree setting section sets the contribution degree ($\alpha$) of the master cylinder pressure (Pm) on a calculation of a final target deceleration (Gt) in accordance with the master cylinder pressure (Pm) and a status of the control flag (F).

15. The braking force control apparatus for the automotive vehicle as claimed in claim 14, wherein the braking force control apparatus further comprises a final target deceleration calculating section that calculates the final target deceleration (Gt) on the basis of the first target deceleration (Gs), the second target deceleration (Gp), and the contribution degree ($\alpha$) of the master cylinder pressure.

16. The braking force control apparatus for the automotive vehicle as claimed in claim 15, wherein the target braking force calculating section calculates the target braking force (Gp) to achieve the final target deceleration (Gt).

17. The braking force control apparatus for the automotive vehicle as claimed in claim 14, wherein the contribution degree setting section sets the contribution degrees of both of the stroke quantity (Ss) and the master cylinder pressure (Pm) on the calculation of the final target deceleration (Gt) in such a manner that the contribution degree ($\alpha$) of the master cylinder pressure is increased from zero to one in accordance with the increase in the master cylinder pressure (Pm) and is larger when the control flag (F) is set to "1" than the contribution degree of the master cylinder pressure when the control flag (F) is reset to "0".

18. The braking force control apparatus for the automotive vehicle as claimed in claim 15, wherein the final target deceleration calculating section calculates the final target deceleration (Gt) as follows:

$$Gt=\alpha \cdot Gp+(1-\alpha) \cdot Gs.$$

19. A braking force control apparatus for an automotive vehicle, comprising:
brake input means manually operable by a vehicle driver;
master cylinder means for developing a master cylinder pressure in accordance with an operation of the brake input means by the vehicle driver;
contribution degree setting means for setting contribution degrees of both of a stroke quantity of the brake input means and the master cylinder pressure developed in the master cylinder means in accordance with at least one of the stroke quantity of the brake input means and the master cylinder pressure developed in the master cylinder means;
target braking force calculating means for calculating a target braking force of the vehicle on the basis of the contribution degrees of both of the stroke quantity of the brake input means and the master cylinder pressure; and
braking force control means for controlling the braking force of the vehicle in accordance with the calculated target braking force, the contribution degree setting means setting the contribution degree of the master cylinder pressure on a calculation of the target braking force to become larger when an abrupt brake operation by the vehicle driver is detected than the contribution degree of the master cylinder pressure when no abrupt brake operation by the vehicle driver is detected, wherein the braking force control apparatus further comprises: stroke quantity detecting means for detecting the stroke quantity of the brake input means; pressure detecting means for detecting the master cylinder pressure developed in the master cylinder means; and abrupt operation detecting means for detecting whether the abrupt brake operation by the vehicle driver occurs and wherein the target braking force calculating means calculates the target braking force on a basis of the stroke quantity of the brake input means, the master cylinder pressure developed in the master cylinder means, and the contribution degree of both of the stroke quantity of the brake unit means and the master cylinder pressure developed in the master cylinder means.

* * * * *